Figure 1:
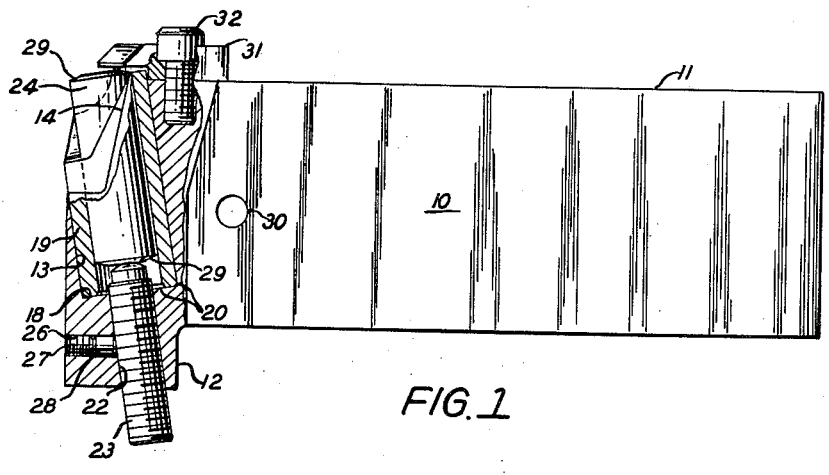

July 30, 1957    F. O. BUETTNER    2,800,703
ROTATING TOOL BIT
Filed July 8, 1953

F. O. BUETTNER
INVENTOR.

BY  E. C. McRae
    J. C. Faulkner
    G. H. Oster

ATTORNEYS

2,800,703

ROTATING TOOL BIT

Frank O. Buettner, Detroit, Mich., assignor to Ford Motor Company, Dearborn, Mich., a corporation of Delaware Application July 8, 1953, Serial No. 366,756

1 Claim. (Cl. 29—96)

This invention relates generally to a tool holder used in connection with machining either rough or finish surfaces in a single or multiple tool setup.

Prior to this invention it was common practice for the tool bit having a cutting tip or insert made of hard carbide alloys to be fixedly secured in the tool holder. Wear was directed against one edge and in difficult machining operations, such as found when removing the initial rough, scaly surface from a forging, resulted in relatively short tool bit life, frequent machine shutdown and a somewhat undesirable surface finish. Instead of cleanly cutting off the surface material, the tool bit would tend to tear or gouge the metal.

This invention prolongs the life of a tool bit substantially and does away with frequent sharpenings resulting, therefore, in considerable savings in time and money as a result of less machine down time and greater production. In essence, the invention incorporates a free revolving tool bit with a cutting edge extending circumferentially the full extent of the tool bit end. The bit cuts through the top surface as it crosses the surface to be machined and allows for faster machining and better surface finish, doing away with tearing of the metal.

To save time in machine shutdown, provisions have been made to allow for sharpening the tool bit at both ends. When one end is found to be in need of sharpening, the bit may be reversed in a matter of minutes and the operation continued. Axial adjustment of the tool bit is easily accomplished by means of a set screw located in the bottom of the tool holder and in axial alignment with said tool bit. The amount of rotation is dependent entirely upon the type, depth, cutting speed and angle of direction taken by the tool bit as it is directed across the surface of the part being machined. A rolling friction relationship exists whereby the bit will revolve in the same direction as it travels. To allow this "free rotation," the tool bit is journaled in a bushing mounting free from axial movement but with sufficient clearance to allow rotational movement without binding or end play. A conventional type tool bit may then be used for the finish cut.

One of the objects of this invention is to permit the use of a tool bit wherein the cutting edge will extend to the entire periphery of the tool bit and means for allowing "free rotation" of this tool bit; the free rotation to result from the directional forces occurring when the tool bit cuts across the surface of a rotating part.

Still another object is to provide a revolving tool bit wherein normal wear will be directed uniformly against the entire circumferential cutting edge so that said tool bit will remain sharper for a longer period of time and be a more efficient usage of the expensive tool bit.

Still another object is to provide simple means securing the rotatable tool bit from deleterious axial movement and side play or slop which would result in an unsatisfactory finish and/or an inaccurately machined surface.

Still another object is to provide simple means for axial adjustment of the tool bit to compensate for wear and subsequent sharpenings and to allow for almost complete utilization of the tool bit.

Other objects and advantages of this invention will be made more apparent as this description proceeds, particularly when considered in connection with the accompanying drawings wherein:

Figure 1, a side elevation of the invention mounted in a tool holder.

Figure 2:
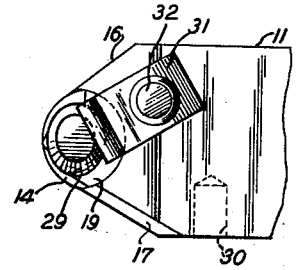

Figure 2, a partial plan view of Figure 1.

Figure 3:
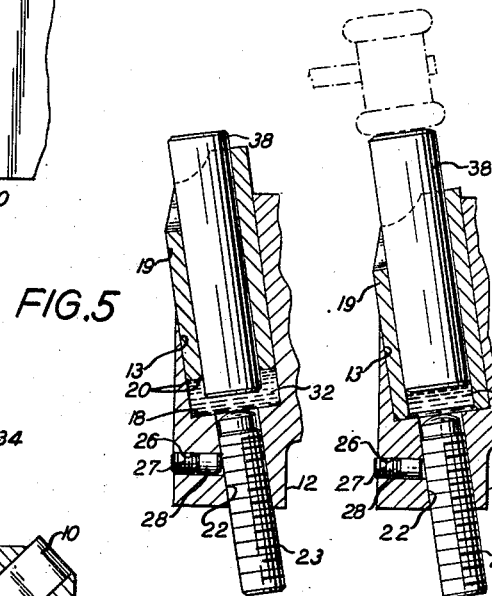

Figure 3, a side view of a typical tool layout showing the invention in use.

Figures 4, 5:
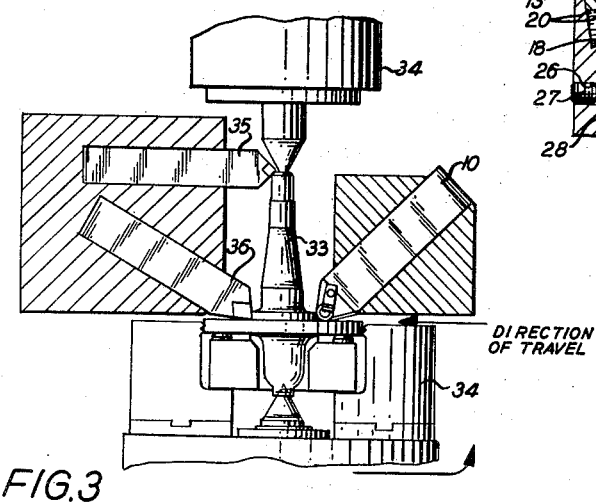

Figures 4 and 5, sectional views illustrating the removal of the bushing.

Referring now to the drawings, the illustrated embodiment of the invention, one type of tool holder is generally designated by the numeral 10 and comprises a tool holder body 11 with an L shaped transverse continuation 12 located at the tool end. In the tool holding continuation 12 is a downwardly and inwardly drilled hole 13 on the vertical center line of the tool holder body 11 and set at angle of about 8°. This angle may vary, of course, but 8° has been found to be most desirable by the inventor. The parallel sides of the tool holder body 11 converged forwardly at the tool end forming sides 16 and 17 and resulting in a recess 14. Side 17 has a relief of approximately 6°, and its angle of convergence is less than that of the side 16 in order to enable the tool holder body 11 to be brought into closer proximity to the surface to be machined. Figure 1 shows the partial definition of the recess 14. The bushing 19 is preferably retained in position in drilled hole 13 by tinning the outside diameter of the bushing and sweating it into place bottoming on shoulder 18 which also serves to position the bushing axially in relation to the top of the tool holder body. An inside and outside radius 20 on the bushing at the point of juncture with shoulder 18 is provided for the purpose of extracting the bushing 19 as shown in Figures 4 and 5. The upper portion of the bushing is cut away to form a recess of the general size and shape shown in Figure 1. Primarily, the purposes of this bushing are to prevent wear on the more expensive body 11 and to form a substantial support for the revolving tool bit 24. In axial alignment with hole 13 is a smaller tapped adjustment hole 22 by which a bit bearing screw 23 with soft threads and a hardened spherical head is threaded upwardly against the center portion of the revolving tool bit 24 which is inserted in bushing 19. The inside diameter of bushing 19 is such a size as to allow the revolving tool bit 24 to rotate within its confines but without substantial axial misalignment or slop between the two parts.

A second tapped hole 26 located in a horizontal plane leads into the tapped hole 22 in order that small set screw 27 may force an insert 28, made from soft non-metallic material, against the soft threads of the bit bearing screw 23 to maintain the proper projection and adjustment of the revolving tool bit 24 in the bushing 19 as shown in Figure 1. Revolving tool bit 24 has a cutting edge 29 extending circumferentially at both ends of the bit. This revolving tool bit 24, as previously stated, may be manufactured from any of the commercially available tool alloys. In order to set and gauge the distance by which the revolving tool bit 24 and the bushing 19 extend beyond the top of body 11, a location hole 30 has been drilled transversely into the body 11 and is used for determining the critical dimensions in the tool and of the tool holder 10.

Superimposed and offset to the side 16 in the tool end is a retainer 31 which is positioned in place by lock screw 32 in order that the overhang on the retainer 31 projects across and slightly above a section of the bushing 19 and the revolving tool bit 24. This is clearly illustrated in Figures 1 and 2. The use of this retainer 31 enables the tool setup man employing this invention to use the tool holder in any degree of angularity applicable to the work to be accomplished without fear of the bit falling out of the bushing 19. An additional purpose is also served by the retainer by steering the chip wash-off in a direction away from the working tool bit 24.

In actual operation, the tool bit holder is brought into contact with the part to be machined, for example, as shown in Figure 3. The tool holder 10 is brought against a surface of the spindle 33 being turned in a conventional vertical lathe, indicated generally at 34. An additional bit 35 is being used for purposes of machining a different section of the spindle 33. As the tool bit 24 comes into contact with the revolving surface of spindle 33, a rolling will take place, and the tool bit rolls across the surface of the spindle face, generally giving a rolling away impetus to the chip wash-off. The extent of rotation is dependent entirely upon the depth of the cut and the speed by which the tool bit 24 crosses the surface of the spindle 33. The bit 36 is utilized after the removal of the metal by tool bit 24 to finish machine the surface and provide the vertical and/or radial configuration required.

The scaly and hard carbide type of surface evident in forgings, particularly, is very easily handled without tearing, gouging or build-up of the metal in front of the tool bit 24. The operation of this invention results in a uniform and constant wear on the cutting edge 29, prolonging the life of the tool bit substantially and utilizing it to the most efficient extent. It is not necessary to remove and resharpen as often as was done previously, and the surface is of a smoother, more uniform nature. It is quite evident that the rough machining may be accomplished at a faster rate of speed resulting in higher production. It is obvious that wear will be evident on the inside surface of bushing 19 and may eventually result in slop or inaccuracy of the cutting resulting from mushrooming or end play. A removal of the bushing, therefore, is made quite easy as shown in Figures 4 and 5. The grease 37 and the rod 38 having the diameter of the revolving tool bit 24 is inserted into the cavity occupied previously by the bit 24 and struck a sharp blow. The action of the grease being compressed will react against the walls of bushing 19 forcing the bushing 19 upwards and outwards, making the removal a simple operation.

I claim as my invention:

In a tool holder in combination, a tool holder body with a cylindrical bit recess provided at one end of said body, a bushing fixedly secured within said recess, a cylindrical tool bit positioned in said bushing and said bushing having a section removed on the work side of said tool holder body and revealing a portion of the tool bit cutting edge, said tool bit having sufficient clearance between it and the bushing to permit free rotation of the bit when the bit is directed across the surface being machined, a superimposed retainer projecting above but not touching the bit to prevent the bit from falling out of the bushing thus permitting the said tool holder to be positioned at any angle.

References Cited in the file of this patent
UNITED STATES PATENTS

| | | |
|---|---|---|
| 543,551 | Hartness | July 30, 1895 |
| 811,027 | Barlow | Jan. 30, 1906 |
| 1,535,028 | Muller | Apr. 21, 1925 |
| 2,513,881 | Low | July 4, 1950 |
| 2,551,167 | Rolland | May 1, 1951 |
| 2,624,103 | Bader | Jan. 6, 1953 |
| 2,651,223 | Hahn | Sept. 8, 1953 |